United States Patent [19]

Ross

[11] 3,813,668

[45] May 28, 1974

[54] ANALOG TO DIGITAL CONVERTER EMPLOYING GROOVED DISC

[75] Inventor: Donald Ross, Chalfont, Pa.

[73] Assignee: Automatic Timing & Controls, Inc., King of Prussia, Pa.

[22] Filed: Oct. 1, 1973

[21] Appl. No.: 402,362

Related U.S. Application Data

[63] Continuation of Ser. No. 251,922, May 10, 1972, abandoned.

[52] U.S. Cl. .......... 340/347 P, 200/14, 235/92 EA

[51] Int. Cl. .......... H01h 19/58, H03k 13/02

[58] Field of Search .......... 340/347 P; 235/92 EA, 61; 200/14, 5 A, 11 R, 155

[56] References Cited

UNITED STATES PATENTS 3,012,719 12/1961 Hohmann .......... 235/92 EA
3,100,299 8/1963 Congdon .......... 340/347 P
3,497,138 2/1970 Fisher .......... 235/61
3,566,049 2/1971 Wright .......... 340/347 DD

*Primary Examiner*—Thomas J. Sloyan
*Attorney, Agent, or Firm*—Maleson, Kimmelman & Ratner

[57] ABSTRACT

A disc containing decimal numbers on its edge is mounted for step-by-step rotation in response to reciprocating action of a push-button. On one side of the disc grooves are formed corresponding to different binary places. Deep portions of the grooves correspond to binary zeros whereas shallower portions correspond to binary ones. A corresponding plurality of resilient sensing wires having protruding shoulder portions engage the respective grooves. When the shoulders touch the shallower portions, they urge the wires laterally until they touch a switch connection thereby actuating a voltage representative of a binary one. Projections are provided on the other side of the disc to prevent back-up or excess forward motion of rotation upon actuation of the push-button.

16 Claims, 4 Drawing Figures

ANALOG TO DIGITAL CONVERTER EMPLOYING GROOVED DISC

This is a continuation of application Ser. No. 251,922, filed May 10, 1972 and now abandoned.

BACKGROUND OF THE INVENTION

1. Field of the Invention

This invention relates to digit wheels used in timing or counting apparatus and in particular to digit wheels for converting decimal digits to binary digits.

2. Prior Art

There are many analog-to-digital code converters including those using so-called printed or etched circuits and those in which there are a number of concentric grooves and a shaft passing through the armature of a miniature differential transformer attached to a roller or wheel which rides up and down transversely to said grooves. The former types are relatively expensive and the brush or other contact material which made electrical contact with conductive portions caused the conductive segments to wear out. The latter type, which required armatures, springs, and small field coils, was also quite expensive.

It is therefore among the objects of the present invention to provide a relatively inexpensive and simple analog-to-digital converter which will not cause undue wear and have a high degree of dependability.

BRIEF SUMMARY OF THE INVENTION

One side of a decimal digit wheel has a plurality of grooves with shallow and deep portions corresponding to the two binary digits. A plurality of resilient elements have shoulders which engage the respective grooves and thereby cause lateral movement of the wire sensors which make electrical contact with a common terminal to correspond to at least one of the two binary digits.

DETAILED DESCRIPTION OF THE DRAWINGS

Figures 1, 2:
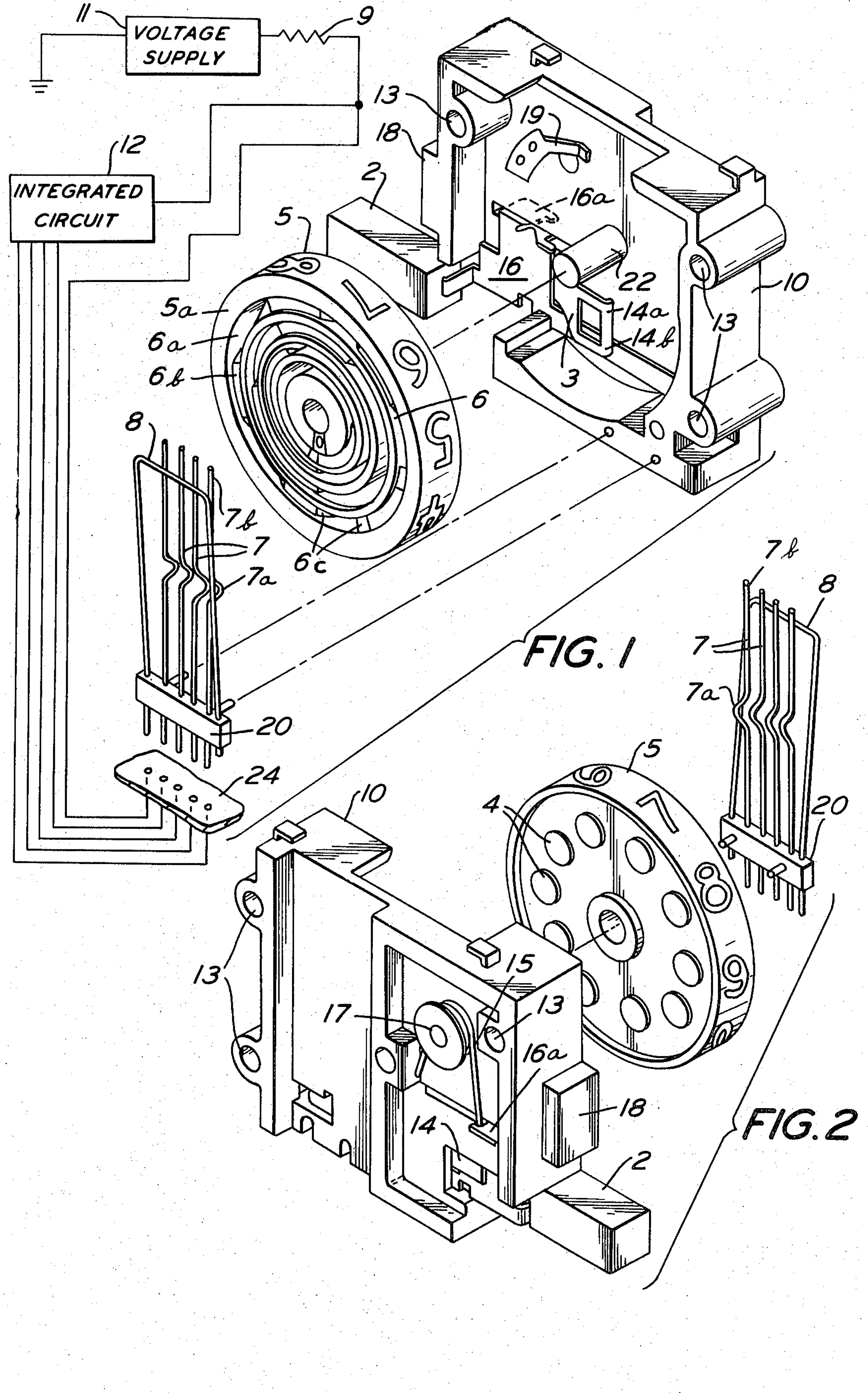
FIG. 1 is an exploded isometric and partially block diagram of the apparatus as viewed from behind.
FIG. 2 is an exploded isometric view of the mechanical portions of the system shown in FIG. 1 as seen from the front.
Figure 3:
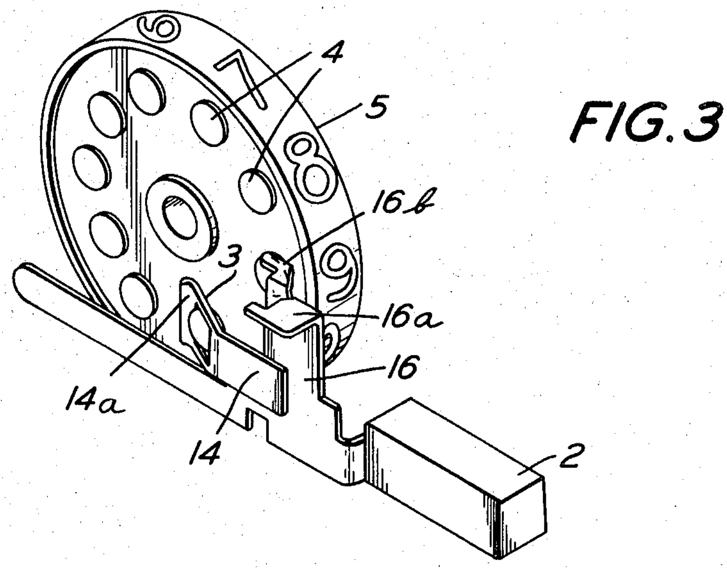
FIG. 3 is an enlarged perspective view of the digit wheel and the push-button actuated member for revolving it.
Figure 4:
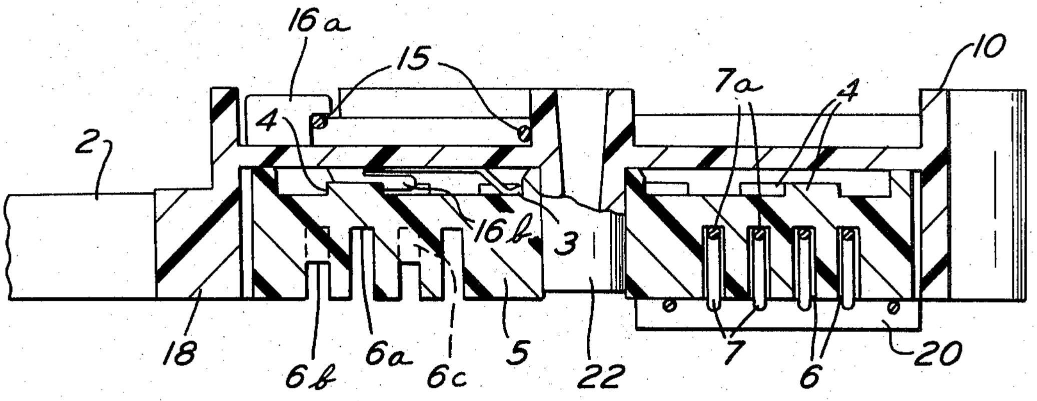
FIG. 4 is an enlarged sectional view of the apparatus shown in FIG. 3 taken along the section line 4—4 of FIG. 1.

In FIGS. 1–4 there is shown an analog-to-digital converter assembly of the type converting decimal digits to binary-representative voltages. This convertor consists essentially of four main parts, the plastic housing indicated generally at the numeral 10, the manually-settable pushbutton actuator 16, the digit wheel 5, and the binary-sensing switch elements 7, 8.

The housing 10 is provided with a plurality of laterally drilled holes 13 through which long screws may be passed for stacking adjacent decades consisting of the same four elements. The housing 10 includes a front number window 18 which may be made of the same plastic as the housing itself if it is transparent. The housing is also fitted with a horizontal shaft 22 on which the number or digit wheel 5 rotates. A metallic spring member 19 is affixed by any conventional method such as pins to the inner wall **10*a* of the housing and has a bent tip portion 19*a* that acts as an anti-back-up member when the digit wheel is advanced step-by-step. This member 19 is biased toward the side of wheel 5 and exerts lateral pressure thereupon when the wheel is mounted on shaft 22. There is a front-to-back groove 19*b* in which the elongated metal actuator portion 16*c* is disposed for reciprocation. A horizontal slot 10*b* is formed in the wall 10*a* to accomodate the bent-over portion 16*a* of the actuator 16.**

On the side of the housing 10 as seen in FIG. 2 is a post 17 around which is wrapped a spring 15 whose longer end engages the actuator portion **16*a* and impels it outwardly, i.e., toward the number window 18. The other end of the spring 15 is constrained by the molded portion 10*c*. A vertical groove or inset portion 10*d* is provided to accommodate the positional changes of the sensing elements 7 when they are moved by the grooves in the number wheel 5 as will be explained below. For manual comfort, there is a push-button 2 fixed to the front end of the actuator 6*d*. The internal portion 16*b* is provided for engaging one of the disc-like projections 4 formed on the number wheel 5 to prevent inadvertent forward movement of the number wheel when the push button 2 has been pushed in and released. The housing 10 is also provided with two lateral holes 10*c* into which the pins 20*a* of the insulator mounting bar 20 tightly fit. This brings the switch sensing elements 7 into a position where they press laterally into the grooves the number wheel 5.**

The projections 4 of the number wheel correspond in number to the visible indicia on the edge of the number wheel and may be molded integrally with the plastic wheel itself. These projections, as stated above, cooperate with portion **16*b* to prevent forward motion of the wheel when the pushbutton is not pressed. They also are engaged, one-by-one, by the aperture 14*b* of the portion 14*a*** of the actuator on the return stroke of the pushbutton to advance the number wheel digit-by-digit.

On the other side of the number wheel are a plurality of concentric circular grooves 6 including deep-cut portions **6*a* and shallow-cut portions 6*b* with a plurality of angled transition planes 6*c* connecting portions 6*a* and 6*b*.**

The grooves 6 of the number wheel are engaged by the projecting shoulder portions **7*a* of the sensing metallic resilient members 7. These members 7 are mounted in the block 20 which fits into the holes 10*c* of the housing. There is also provided on the block 20 a generally inverted-U-shaped resilient metallic member 8. The lower ends of the members 7 and 8 protrude from below the bar 20 and may be directly plugged into holes in a printed circuit board indicated schematically at 24.**

OPERATION

When the pushbutton 2 is pushed inwardly, the rear, outwardly-bent portion of member **14*a* is at first cammed outwardly by the next-adjacent one of the projections 4 thereby allowing that projection to slide under portion 14*a* until it is aligned with aperture 14*b*. When it is, portion 14*a*, being biased toward wheel 5, will snap laterally toward the wheel framing that projection. When the pressure on the button 2 is released, the forward bias exerted by the spring 15** on the portion

16*a* causes the pushbutton to move outwardly again. As a result, the rear vertical edge of the opening 14*b* will impel the projection 4 which it then frames toward the front of the apparatus with the result that the wheel 5 will rotate forwardly one-tenth of a rotation. In the pushbutton "out" position, wheel 5 is limited in its forward rotation by the action of the lip 16*b* which, at the end of the return or forward stroke bears against the top of one of the projections 4. It is also limited in its backward rotation by the pressure of the portion 19*a* of the anti-back-up device 19 on the side of another one of the projections 4.

As the wheel rotates, say from number 8 to 9, the shoulders 7*a* are engaging the grooves 6 and when the number 9 is behind the number window 18, the two outer members 7 (i.e., the ones closest to the ends of bar 20) are pressed up against the member 8. This is because their shoulder portions 7*a* are riding on shoulder portions 6*b*. The two intermediate members are not in contact because they are riding in deep groove portions 6*a*. It should be noted that this corresponds to binary notation 1001. Similarly, if the pushbutton is pressed inward again and released, bringing the "0" in front of the number window 18, none of the portions 7*b* will contact the portion 8 and this corresponds to binary 0000.

When the portions 7*b* do contact the horizontal bight of member 8, they close a circuit connected to a particular part of the associated integrated circuit 12 that is supplied with voltage from voltage supply 11 through resistor 9.

Of course the present invention may be used with other than decimal numbers and binary digit systems provided the indicia on the wheel 5 and the groove depths are modified accordingly. This may also necessitate more than one contact bar 8 and elongated members 7 having different lengths or other configurations.

Still other modifications, which do not depart from the essence of the present invention, will occur to those skilled-in-the-art upon perusal of the description and drawings herein. Consequently, this invention should be limited by the claims which follow.

I claim:

1. A number wheel-switch assembly or the like comprising:

a a generally disc-like wheel having two opposed parallel sides and on at least one side thereof a selected number of generally concentric grooves formed therein corresponding to a selected number of columns whose relative depth is measured with respect to the ungrooved surface of said one side, each groove having shallow and deep portions corresponding to digits, b a selected number of resilient elongated members disposed in a generally common plane which is substantially parallel to said grooved surface and having first portions which protrude from said common plane to respectively engage said grooves and second conductive portions which are disposed generally in said common plane and have terminals adapted to be connected to an electrical circuit, c a conductive member whose axis lies in a plane substantially parallel to said common plane which is disposed in proximity to said second portions and has terminals adapted to be connected to an electrical circuit, said resilient members having their second portions respectively arranged to be brought into or out of contact with said conductive member by being moved in a direction substantially normal to and away from said grooved surface depending on whether their respective first portions are engaging shallow or deep portions of the grooves in which they are disposed, and d means associated with said wheel for causing rotation thereof whereby binary code switching action uniquely corresponding to said digits is established.

2. The assembly according to claim 1 wherein said second portions are respectively brought into contact with said conductive member when their corresponding first portions engage respective associated shallow portions of the grooves in which they are disposed.

3. The assembly according to claim 1 wherein said wheel has decimal indicia on its edge, wherein said shallow and deep portions correspond to binary digits, wherein said elongated members are mounted so that said first portions normally exert pressure laterally of said disc into said grooves and wherein said rotation-causing means is push-button-operated.

4. The assembly according to claim 1 wherein said rotation-causing means is push-button-actuated.

5. The assembly according to claim 4 with the addition of means for preventing back-up of said wheel when said push-button means has been used to advance said wheel one step.

6. The assembly according to claim 5 with the addition of means for preventing undue forward rotational motion of said wheel when said push-button-actuated means has advanced the wheel by a step.

7. The assembly according to claim 6 wherein said wheel includes a plurality of projections on one side thereof to enable said push-button-actuated means to advance said wheel stepwise.

8. The assembly according to claim 4 with the addition of resilient means coupled to said pushbutton-actuater means to bias said latter means to a normally outward position.

9. The assembly according to claim 1 wherein said selected digits are binary digits and wherein there are at least four of said grooves.

10. The assembly according to claim 1 wherein said elongated members are substantially parallel wire segments insulatingly mounted with respect to one another.

11. The converter according to claim 10 wherein the first portions of said members are substantially U-shaped projections formed in said members which extend into the grooves in said wheel.

12. The assembly according to claim 1 wherein said conductive member is a wire segment generally shaped like an inverted U.

13. The assembly according to claim 1 wherein said wheel has a plurality of projections formed in one of its sides and said rotation-causing means engages said projections one-by-one to impart rotary movement to said wheel.

14. The assembly according to claim 13 with the addition of resilient means which engages said projections to prevent back-up of said wheel between actuations of said rotation-causing means.

15. The assembly according to claim 13 with the addition of means which engage said projections to prevent undesired forward rotary motion of said wheel between actuations of said rotation-causing means.

16. The assembly according to claim 13 wherein said additional means is connected to said rotation-causing means.

* * * * *